US012759037B2

(12) United States Patent
Davies

(10) Patent No.: US 12,759,037 B2
(45) Date of Patent: Oct. 13, 2026

(54) PEX EXPANSION TOOL

(71) Applicant: MILWAUKEE ELECTRIC TOOL CORPORATION, Brookfield, WI (US)

(72) Inventor: Peter J. Davies, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/179,005

(22) Filed: Mar. 6, 2023

(65) Prior Publication Data

US 2023/0201907 A1 Jun. 29, 2023

Related U.S. Application Data

(62) Division of application No. 16/795,727, filed on Feb. 20, 2020, now Pat. No. 11,596,999.

(60) Provisional application No. 62/807,878, filed on Feb. 20, 2019.

(51) Int. Cl.

*B21D 41/02* (2006.01)
*B29C 57/06* (2006.01)
*B29K 23/00* (2006.01)
*B29L 23/00* (2006.01)

(52) U.S. Cl.

CPC ............ *B21D 41/028* (2013.01); *B29C 57/06* (2013.01); *B29K 2023/0691* (2013.01); *B29L 2023/22* (2013.01)

(58) Field of Classification Search

CPC ................ B21D 41/021; B21D 41/026; B21D 41/02–028; B21D 39/20; B29C 57/045; B29C 57/04–06; B29L 2023/22; B29K 2023/0691; B29K 2105/258; B29D 23/001

USPC ........ 72/370.06, 370.08, 392, 393; 264/313; 425/392, 393

See application file for complete search history.

(56) References Cited

U.S. PATENT DOCUMENTS 1,404,819 A 1/1922 Wiedeke
1,752,408 A 4/1930 Zein
2,085,447 A 6/1937 Plaine (Continued)

FOREIGN PATENT DOCUMENTS

CN 201346602 Y 11/2009
CN 204018564 U 12/2014

(Continued)

OTHER PUBLICATIONS

European Patent Office Partial Search Report for Application No. 20158531.2 dated Jun. 18, 2020 (13 pages).

(Continued)

*Primary Examiner* — Jeffrey M Wollschlager
*Assistant Examiner* — Edgaredmanuel Troche
(74) *Attorney, Agent, or Firm* — Michael Best & Friedrich LLP

(57) ABSTRACT

An expansion tool includes a housing, a motor supported by the housing, a mandrel, and a drive mechanism configured to convert a rotational input from the motor into translational movement of the mandrel between an extended position and a retracted position. The expansion tool is configured to perform cycles of axially extending and retracting the mandrel. An elapsed time for one cycle of moving the mandrel from the retracted position to the extended position and back to the retracted position defines a cycle time of the expansion tool. The cycle time is one second or less.

19 Claims, 2 Drawing Sheets

(56) References Cited

U.S. PATENT DOCUMENTS 2,725,918 A 12/1955 Deshler
2,737,996 A 3/1956 Toth
2,835,307 A 5/1958 Jorgensen
2,999,529 A 9/1961 Rast
3,550,424 A 12/1970 Rast
3,677,684 A 7/1972 Platz
3,753,635 A 8/1973 Barnett
3,857,666 A 12/1974 Barnett
3,861,847 A 1/1975 Barnett
3,888,102 A 6/1975 Nigido
3,940,227 A 2/1976 Strasser
3,947,950 A 4/1976 Adams
4,034,591 A 7/1977 Rothenberger
4,107,249 A 8/1978 Murai et al.
4,144,735 A 3/1979 Rothenberger
4,154,083 A 5/1979 Rothenberger
4,397,173 A 8/1983 Eftefield et al.
4,425,783 A 1/1984 Rast
4,603,890 A 8/1986 Huppee
4,733,551 A 3/1988 Bryant et al.
4,735,078 A 4/1988 Wesebaum
4,888,975 A * 12/1989 Soward .................. B25B 27/00 384/909
4,890,472 A 1/1990 Rothenberger
5,046,349 A 9/1991 Velte
5,090,226 A 2/1992 Takeoka et al.
5,090,230 A 2/1992 Koskinen
5,135,268 A 8/1992 McNaughton et al.
5,243,845 A 9/1993 Velte
5,261,709 A 11/1993 McNaughton et al.
5,704,244 A 1/1998 Halasz et al.
5,727,414 A 3/1998 Halasz et al.
5,744,085 A 4/1998 Soberg
5,879,033 A 3/1999 Hansel et al.
5,943,891 A 8/1999 Takagi et al.
6,199,915 B1 3/2001 Becker
6,783,160 B2 8/2004 Rowley
6,862,766 B2 3/2005 Geurts
7,014,214 B2 3/2006 Kaneko
7,065,995 B2 6/2006 Frenken
7,128,560 B2 10/2006 Tandart
7,325,436 B2 2/2008 Cheng
7,490,499 B2 2/2009 Suzuki et al.
7,516,990 B2 4/2009 Jamison et al.
7,681,636 B2 3/2010 Roggeband et al.
7,735,877 B2 6/2010 Ito et al.
7,806,213 B2 10/2010 Inoue et al.
7,922,475 B2 4/2011 Gueit
8,302,448 B2 11/2012 Woelcken et al.
8,303,295 B2 11/2012 Gueit
8,371,409 B2 2/2013 Inoue et al.
8,511,133 B1 8/2013 Chen
8,517,715 B2 8/2013 Thorson et al.
8,534,711 B2 9/2013 Inoue et al.
8,562,331 B2 10/2013 Schramm et al.
8,763,439 B2 7/2014 Thorson et al.
9,027,966 B2 5/2015 Altmann et al.
9,089,889 B2 7/2015 Kohnen
9,248,617 B2 2/2016 Lundequist et al.
9,808,852 B2 11/2017 Frenken
9,862,137 B2 1/2018 Dickert et al.
9,914,260 B2 3/2018 Ellice
9,975,289 B2 5/2018 Li et al.
9,993,961 B2 6/2018 Dickert et al.
10,000,007 B2 6/2018 Dickert et al.
10,173,310 B2 1/2019 Wyler et al.
10,195,783 B2 2/2019 Dickert et al.
10,406,586 B2 9/2019 Frenken
2004/0253340 A1* 12/2004 Tandart .................. B29C 57/04 425/392
2005/0093298 A1 5/2005 Takayanagi
2006/0201228 A1 9/2006 Rothenberger
2007/0057393 A1 3/2007 Hartmann et al.
2007/0204666 A1* 9/2007 Suzuki .................. B21D 39/20 72/122
2008/0122222 A1 5/2008 Sheppard
2008/0160130 A1 7/2008 Gueit
2010/0308503 A1* 12/2010 Schramm ............. B29C 57/045 264/312
2011/0239674 A1 10/2011 Defilippi
2012/0217674 A1* 8/2012 Greding ............... B21D 41/026 264/290.2
2013/0341831 A1 12/2013 Thorson et al.
2015/0258598 A1* 9/2015 Frenken ................ F15B 15/063 72/393
2018/0029286 A1* 2/2018 Li ........................ B21D 41/028
2019/0351605 A1 11/2019 Trickle
2020/0094306 A1* 3/2020 Savolainen ............. B29C 57/08
2020/0094465 A1 3/2020 Lindsey et al.
2020/0261958 A1 8/2020 Davies
2020/0261959 A1 8/2020 Wekwert et al.
2021/0254773 A1 8/2021 Adelman et al.
2022/0168793 A1 6/2022 Davies et al.
2023/0031227 A1 2/2023 Brochman

FOREIGN PATENT DOCUMENTS

CN 107838304 A 3/2018
CN 207308769 U 5/2018
DE 497609 C 5/1930
DE 2800079 A1 7/1978
DE 3439522 A1 8/1985
DE 4003994 A1 8/1991
DE 4005474 A1 9/1991
DE 19730054 C1 3/1999
DE 19924695 A1 11/2000
DE 19963885 C1 5/2001
DE 10063517 A1 7/2002
DE 20301139 U1 6/2004
DE 102005033482 A1 1/2007
DE 102006015368 A1 10/2007
DE 202008002265 U1 4/2008
DE 202008002266 U1 4/2008
DE 102007053518 A1 5/2009
DE 102008061441 A1 7/2009
DE 102008064320 A1 6/2010
DE 102013208330 A1 11/2014
EP 0234283 A1 9/1987
EP 0397570 A1 11/1990
EP 0462719 A2 12/1991
EP 0567742 A2 11/1993
EP 0718057 A2 6/1996
EP 0878287 A1 11/1998
EP 0967427 A2 12/1999
EP 1118401 A1 7/2001
EP 1278001 A2 1/2003
EP 1930640 A1 6/2008
EP 2090384 A2 8/2009
EP 3520923 A1 8/2019
FR 2451235 A1 10/1980
FR 2645052 A1 10/1990
GB 1485098 A 9/1977
GB 1524149 A 9/1978
WO 8800503 A1 1/1988
WO 96020798 A1 7/1996
WO 96040457 A2 12/1996
WO 0189736 A1 11/2001

OTHER PUBLICATIONS

European Patent Office Extended Search Report for Application No. 20158531.2 dated Sep. 18, 2020 (12 pages).
Extended European Search Report for Application No. 25184856.0 dated Jul. 31, 2025 (8 pages).

* cited by examiner

PEX EXPANSION TOOL

CROSS-REFERENCE TO RELATED APPLICATIONS

This application is a divisional of U.S. Non-Provisional patent application Ser. No. 16/795,727 filed on Feb. 20, 2020, now U.S. Pat. No. 11,596,999, which claims priority to U.S. Provisional Patent Application No. 62/807,878 filed on Feb. 20, 2019, the entire contents of each of which are incorporated herein by reference.

FIELD OF THE INVENTION

The present disclosure relates to pipe and tubing expansion tools. More particularly, the present disclosure relates to PEX (cross-linked polyethylene) expansion tools.

BACKGROUND OF THE INVENTION

PEX tubing is commonly used in plumbing applications as a substitute for copper pipe. PEX tubing can be coupled to fittings in various ways. Crimp rings or clamp rings can be compressed onto the outside of PEX tubing over a fitting to couple the PEX tubing to the fitting. Alternatively, the PEX tube can be expanded and the fitting inserted into the expanded end of the PEX tube. The PEX tube elastically recovers around the fitting to form a tight connection. Tools used to expand PEX tube for this purpose are referred to as PEX expansion tools.

SUMMARY OF THE INVENTION

The present invention provides, in another aspect, an expansion tool including a housing, a motor supported by the housing, a mandrel, and a drive mechanism configured to convert a rotational input from the motor into translational movement of the mandrel between an extended position and a retracted position. The expansion tool is configured to perform cycles of axially extending and retracting the mandrel, and an elapsed time for one cycle of moving the mandrel from the retracted position to the extended position and back to the retracted position defines a cycle time of the expansion tool. The cycle time is one second or less.

The present invention provides, in another aspect, an expansion tool including a housing, a motor supported by the housing, a mandrel, and a drive mechanism configured to convert a rotational input from the motor into translational movement of the mandrel between an extended position and a retracted position. The expansion tool is configured to perform cycles of axially extending and retracting the mandrel. The mandrel is movable from the retracted position to the extended position in a first time period, and the mandrel is movable from the extended position to the retracted position in a second time period different than the first time period. The first time period and the second time period collectively define a cycle time of the expansion tool.

Other aspects of the disclosure will become apparent by consideration of the detailed description and accompanying drawings.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
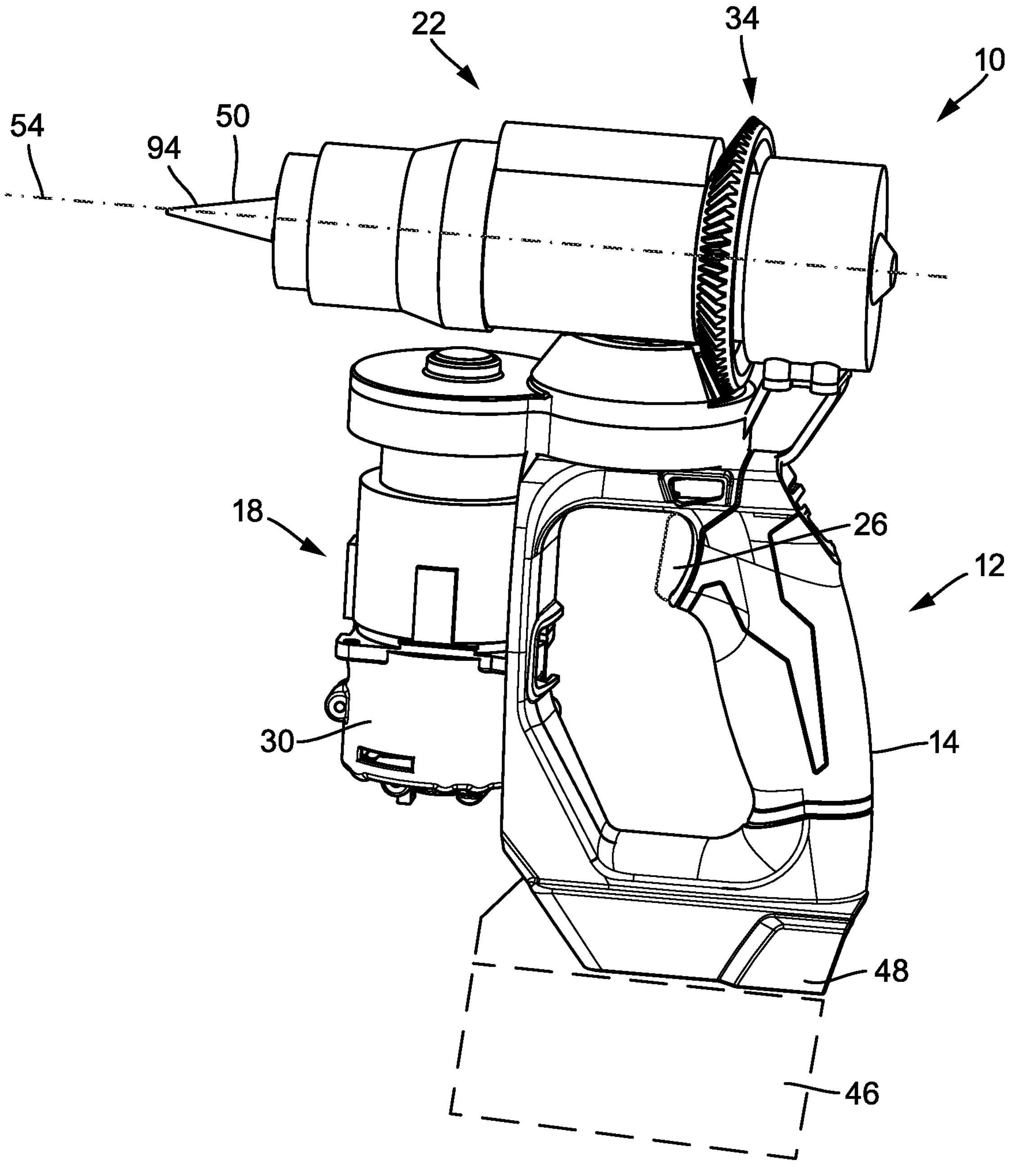
FIG. 1 is a perspective view of an expansion tool according to an embodiment of the present disclosure.

FIG. 1 illustrates an expansion tool 10 usable to expand PEX tubing prior to inserting a fitting. The expansion tool 10 includes a housing 12 (only a portion of which is illustrated in FIG. 1) with a handle 14 configured to be gripped by a user during operation of the expansion tool 10. The housing 12 supports a motor casing 18 and a drive casing 22. An actuator 26 (e.g., a trigger) for operating the expansion tool 10 is positioned on the handle 14.

Figure 2:
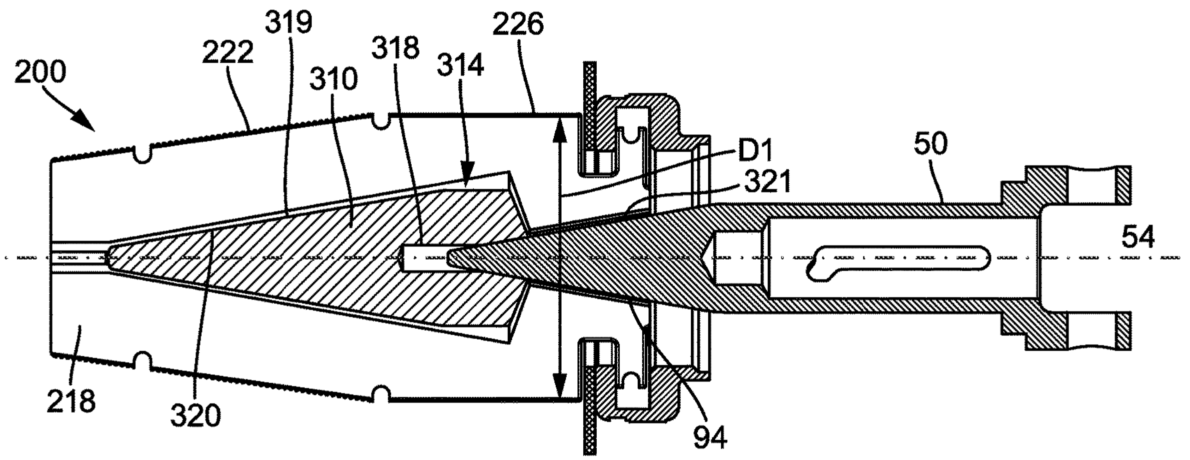
FIG. 2 is a perspective view illustrating a working element according to one embodiment of the present disclosure, usable with the expansion tool of FIG. 1 and illustrated in an initial state.

Referring to FIG. 2, a motor 30 is supported within the motor casing 18, and a drive mechanism 34 is supported at least partially within the drive casing 22. In the illustrated embodiment, a battery 46 provides electrical power to the motor 30 (e.g., in response to the actuation of the actuator 26). The battery 46 is removably coupled to a battery receptacle 48 located at a base of the handle 14.

With reference to FIG. 1, the drive mechanism 34 converts a rotational input from the motor 30 into a translational movement of a mandrel 50 along a mandrel axis 54. The mandrel 50 includes a conical outer surface 94 engageable with a working element 200 (FIGS. 2 and 3) that is configured to be attached to the expansion tool 10. More specifically, the mandrel 50 is driven in a reciprocating manner, to expand and retract the working element 200. The working element 200 is movable from an initial or closed position (illustrated in FIG. 2) toward an expanded position (FIG. 3) in response to movement of the mandrel 50 along the axis 54 from a retracted position toward an extended position. The working element 200 may be biased toward the initial position by a spring element (e.g., an o-ring), such that the working element 200 returns to the initial position when the mandrel 50 retracts.

Figure 3:
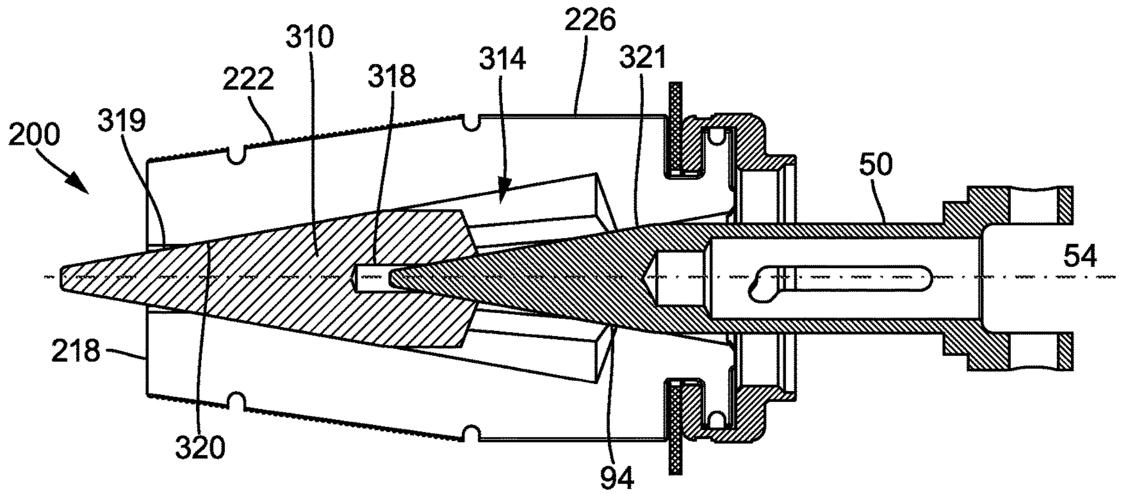
FIG. 3 is a perspective view illustrating the working element of FIG. 2 in an expanded state.

Referring to FIGS. 2 and 3, the working element 200 includes a plurality of jaws 218, each having an exterior side with a tapered portion 222 and a sizing portion 226. When the working element 200 is in the closed or retracted position (FIG. 2), adjacent jaws 218 abut one another, and the tapered portions 222 of the jaws 218 collectively define a frustoconical profile. The sizing portions 226 of each of the jaws 218 collectively define a cylindrical profile with a diameter or maximum cross-sectional dimension D1. The dimension D1 is sized for proper expansion of PEX tubing of a nominal size when the jaws 218 are inserted into an end of the PEX tubing.

The illustrated working element 200 further includes a second mandrel 310 at least partially received within an internal cavity 314 defined by the inner sides of the jaws 218. Referring to FIG. 2, when the working element 200 is in the closed position, the second mandrel 310 is positioned entirely within the internal cavity 314. The mandrel 50 of the expansion tool 10 (i.e. the first mandrel) extends into the working element 200 and is coupled to the second mandrel 310. In the illustrated embodiment, an end of the first mandrel 50 is received within a bore 318 in the second mandrel 310 to couple the first mandrel 50 to the second mandrel 310.

In some embodiments, the mandrel 50, and/or the working element 200 may be configured to rotate about the mandrel axis 54 before, during, or after expansion of the working element 200. For example, the expansion tool 10 may include a rotation assembly with a rotation collar as described and illustrated in U.S. Pat. No. 8,763,439 to Milwaukee Electric Tool Corporation, the entire content of which is incorporated herein by reference.

The illustrated expansion tool 10 includes cycles of axially extending and retracting the mandrel 50, which may include reversing the operating direction of the motor 30 in some embodiments. In other embodiments, the expansion tool 10 may perform cycles of axially extending and retracting the mandrel 50 in response to continuous operation of the motor 30 in a single operating direction. In such embodiments, the expansion tool 10 may include a motion converting mechanism (such as a cam and follower mechanism) configured to convert a rotational input from the motor 30 into reciprocating movement of the mandrel 50.

The expansion tool 10 includes a controller (not shown) configured to control operation of the expansion tool 10 (e.g., energize the motor 30 to rotate the driving mechanism 34 a desired number of cycles, reverse the operating direction of the motor 30, etc.). In operation, the working element 200 (FIGS. 2-3) is inserted into an end of a segment of PEX tubing to be expanded. The tapered portion 222 abuts an interior wall of the PEX tubing. The operator depresses the actuator 26, and the motor 30 and the drive mechanism 34 perform a cycle of axially extending and retracting the mandrel 50, thereby expanding and contracting the jaws 218 of the working element 200.

More specifically, the motor 30 drives the drive mechanism 34 in a first direction (i.e. a forward direction) to extend the first mandrel 50 (FIG. 1). As the first mandrel 50 is extended, it engages the second mandrel 310 to move the second mandrel 310 forward (i.e. to the left in FIGS. 2-3) along the axis 54 within the internal cavity 314. The second mandrel 310 includes a tapered outer surface 319 that engages a corresponding internal surface 320 on each of the jaws 218 to urge the jaws 218 radially outward. The exterior surface 94 of the first mandrel 50, which is spaced from the tapered outer surface 319 of the second mandrel 310 along the axis 54, is engageable with a corresponding internal surface 321 adjacent the rear end of each of the jaws 218. Thus, the working element 200 engages the jaws 218 at two separate, spaced contact areas. By engaging the jaws 218 at two separate contact areas, the jaws 218 are expanded more evenly. After expanding the jaws 218, the motor 30 drives the drive mechanism 34 in a second direction (i.e. a reverse direction) to retract the mandrel 50, allowing the jaws 218 to retract (e.g., under the influence of a spring).

The elapsed time for a cycle of axially extending and retracting the mandrel 50 defines a cycle time TC of the expansion tool 10. More specifically, the mandrel 50 is movable from a retracted position to an extended position in a first time period T1 in response to operation of the motor 30 in the first direction. The mandrel 50 is movable from the extended position to the retracted position in a second time period T2 in response to operation of the motor 30 in the second direction. The first time period T1 and the second time period T2 collectively define the cycle time TC of the expansion tool 10.

In the illustrated embodiment, the cycle time TC is about one second or less. In some embodiments, the second time period T2 is less than the first time period T1. That is, the mandrel 50 retracts at a faster rate than it extends to take advantage of the reduced load on the mandrel 50 when moving toward the retracted position. In some embodiments, the controller may operate the motor 30 at two different speeds. Alternatively, the time periods T1 and T2 can be varied in other ways. Retracting the mandrel 50 more quickly contributes to a short cycle time TC, which advantageously minimizes the time required to fully expand the PEX tubing to receive a fitting.

The expansion tool 10 continues the cycles of axially extending and retracting the mandrel 50. The operator pushes the jaws 218 deeper into the PEX tubing with each successive expansion until the sizing portion 226 is received within the PEX tubing. This indicates to the operator that expansion is complete (e.g., to a dimension D1). The jaws 218 are withdrawn from the PEX tubing, and the operator inserts a fitting into the end of the PEX tubing. The interior of the PEX tubing then elastically recovers and secures the fitting in place.

Various features and aspects of the present invention are set forth in the following claims.

What is claimed is:

1. An expansion tool comprising:

a housing;

a motor supported by the housing;

a working element coupled to the housing and including a plurality of jaws;

a first mandrel;

a second mandrel coupled to the first mandrel; and a drive mechanism configured to convert a rotational input from the motor into translational movement of the first mandrel and the second mandrel between an extended position and a retracted position, wherein the expansion tool is configured to perform cycles of axially extending and retracting the first mandrel and the second mandrel, wherein the first mandrel includes a first portion defining a first contact surface engageable with the jaws and the second mandrel includes a second portion defining a second contact surface engageable with the jaws, wherein the first contact surface is spaced from the second contact surface, wherein the first mandrel and the second mandrel are engageable with the jaws to move the jaws from a closed position toward an expanded position to expand an end of a tube in response to movement of the first mandrel and the second mandrel from the retracted position toward the extended position, wherein an elapsed time for one cycle of moving the first mandrel and the second mandrel from the retracted position to the extended position and back to the retracted position defines a cycle time of the expansion tool, and wherein the cycle time is one second or less.

2. The expansion tool of claim 1, further comprising a battery pack removably coupled to the housing, wherein the battery pack is configured to provide power to the motor.

3. The expansion tool of claim 1, wherein the end of the tube is an end of a PEX tube, wherein the jaws are insertable into the end of the PEX tube when the jaws are in the closed position and to expand the end of the PEX tube when the jaws move toward the expanded position.

4. The expansion tool of claim 1, wherein the jaws define an internal cavity when the jaws are in the closed position.

5. The expansion tool of claim 4, wherein the second mandrel is positioned entirely within the internal cavity when the jaws are in the closed position, and wherein an end of the first mandrel is received within a bore in the second mandrel to couple the first mandrel to the second mandrel.

6. The expansion tool of claim 1, wherein the cycles of axially extending and retracting the first mandrel and the second mandrel includes reversing an operating direction of the motor.

7. The expansion tool of claim 6, wherein the motor drives the drive mechanism in a first direction to move the first mandrel and the second mandrel to the extended position, and wherein the motor drives the drive mechanism in a second direction to move the first mandrel and the second mandrel to the retracted position, the second direction different than the first direction.

8. The expansion tool of claim 7, wherein the first direction is a forward direction and the second direction is a reverse direction.

9. The expansion tool of claim 1, wherein each of the jaws includes an exterior side having a tapered portion and a sizing portion, wherein the tapered portions of the jaws collectively define a frustoconical profile when the jaws are in the closed position, and wherein the sizing portions of the jaws collectively define a cylindrical profile having a maximum cross-sectional dimension sized for expansion of the end of the tube of a nominal size.

10. The expansion tool of claim 1, wherein the second contact surface is a tapered outer surface of the second mandrel engageable with a first internal surface of each of the jaws, and wherein the first contact surface is a conical outer surface of the first mandrel engageable with a second internal surface adjacent a rear end of each of the jaws.

11. The expansion tool of claim 1, further comprising a spring element configured to bias the working element toward the closed position such that the working element returns to the closed position when the first mandrel and the second mandrel move toward the retracted position, wherein the spring element includes an o-ring.

12. An expansion tool comprising:
- a housing;
- a motor supported by the housing;
- a working element coupled to the housing, the working element including a plurality of jaws;
- a first mandrel;
- a second mandrel coupled to the first mandrel; and
- a drive mechanism configured to convert a rotational input from the motor into translational movement of the first mandrel and the second mandrel between an extended position and a retracted position,
- wherein the expansion tool is configured to perform cycles of axially extending and retracting the first mandrel and the second mandrel,
- wherein the first mandrel includes a first portion defining a first contact surface engageable with the jaws and the second mandrel includes a second portion defining a second contact surface engageable with the jaws,
- wherein the first contact surface is spaced from the second contact surface,
- wherein the first contact surface and the second contact surface bear against the jaws to expand the jaws when the first mandrel and the second mandrel move from the retracted position toward the extended position,
- wherein the first mandrel and the second mandrel are movable from the retracted position to the extended position in a first time period,
- wherein the first mandrel and the second mandrel are movable from the extended position to the retracted position in a second time period different than the first time period, and
- wherein the first time period and the second time period collectively define a cycle time of the expansion tool.

13. The expansion tool of claim 12, wherein the first time period is longer than the second time period.

14. The expansion tool of claim 12, wherein the cycle time is one second or less.

15. The expansion tool of claim 12, wherein the cycles of axially extending and retracting the first mandrel and the second mandrel includes reversing an operating direction of the motor.

16. The expansion tool of claim 15, wherein during the first time period, the motor drives the drive mechanism in a first direction to move the first mandrel and the second mandrel from the retracted position to the extended position, and wherein during the second time period, the motor drives the drive mechanism in a second direction to move the first mandrel and the second mandrel from the extended position to the retracted position, the second direction different than the first direction.

17. The expansion tool of claim 15, wherein the first direction is a forward direction and the second direction is a reverse direction.

18. The expansion tool of claim 12, further comprising a controller configured to operate the motor at a first speed during the first time period and at a second speed, different than the first speed, during the second time period.

19. The expansion tool of claim 12, further comprising a handle configured to be gripped by a user, a battery receptacle located at a base of the handle, and a battery pack removably coupled to the battery receptacle and configured to provide power to the motor.

* * * * *